United States Patent [19]

Kawaguchi et al.

[11] 3,857,756

[45] Dec. 31, 1974

[54] PROCESS FOR PRODUCTION OF ANTIBIOTIC

[75] Inventors: Hiroshi Kawaguchi, Tokyo; Koji Tomita, Kanagawa; Hiroshi Tsukiura, Tokyo; Kyo-Ichiro Saito, Kanagawa, all of Japan

[73] Assignee: Bristol-Myers Company,, New York, N.Y.

[22] Filed: Aug. 30, 1972

[21] Appl. No.: 284,795

[52] U.S. Cl.................................... 195/96, 195/29
[51] Int. Cl................................................ C12d 9/00
[58] Field of Search..................... 195/29, 96, 80 R

[56] References Cited
UNITED STATES PATENTS
3,751,339   8/1973   Suzuki et al. ......................... 195/96

Primary Examiner—Alvin E. Tanenholtz
Assistant Examiner—Thomas G. Wiseman
Attorney, Agent, or Firm—James Magee, Jr.; Robert E. Havranek; Herbert W. Taylor, Jr.

[57] ABSTRACT

The specification discloses the production of *D-threo*-1-p-nitrophenyl-2-propionamido-1,3-propanediol, an antibiotic analogue of chloramphenicol. The compound is produced by fermentation by an organism of the genus *Arthrobacter* and identified by ATCC number 21814.

3 Claims, No Drawings

PROCESS FOR PRODUCTION OF ANTIBIOTIC

BACKGROUND OF THE INVENTION

D-threo-1-p-nitrophenyl-2-propionamido-1,3-propanediol is an analogue of the known antibiotic chloramphenicol. Both are disclosed by Rebstock in *J. Amer. Chem. Soc.*, 72:4800-3 (1950). A fermentation process for the production of the propionyl-substituted compound by a species of Arthrobacter is disclosed in German Offenlegungsschrift 2,120,153 and also in *Chem. Abstracts*, Vol. 76, 1972, 32866X.

DESCRIPTION OF THE INVENTION

This invention is directed to antibiotics and, more particularly, to a process for preparing the antibiotic compound D-threo-1-p-nitrophenyl-2-propionamido-1,3-propanediol.

D-threo-1-p-nitrophenyl-2-propionamido-1,3-propanediol has been isolated from the fermentation broth produced by a strain of bacteria collected at Mt. Hoh-oh, Yamanashi, Japan, and identified by the number C501-B8. This organism has been characterized as belonging to the genus *Arthrobacter* and more specifically identified as *Arthrobacter oxamicetus* var. *propiophenicolus*. A culture of this organism has been deposited with the American Type Culture Collection, Rockville, Md., as ATCC 21814. The compound is produced by cultivating the organism in an aqueous carbohydrate medium containing a nitrogenous nutrient under aerobic conditions, preferably submerged, and recovering the compound from the broth. The compound is a neutral solvent-extractable, colorless crystalline substance.

The fermentation can be carried out at temperatures from about 20° to about 32° C. and a pH in the range of about 4 to 10.

MORPHOLOGICAL CHARACTERISTICS OF THE ORGANISM

Strain C501-B8 exhibits a noticeable difference between young cells and aged cells. Also, among cells of the same generation, there are various forms, which are characteristic of the "coryneform" bacteria group.

Young cells (12 to 24 hours) are rods of various shapes, including filamentous form, being straight, bent, curved and occasionally having a rudimentary branch. V-shaped cells suggest snapping division. Although they are generally non-motile, motile cells are occasionally found among the young cells.

Rod-shaped cells develop, after 24 hours or later, into a mass of coccal units including single, paired or chained cocci. Most of the chains are zigzag in arrangement and form clumps.

Gram stain is positive. The size of the cells ranges from about 0.7 to 1.0 by 1.0 to 7 microns. The organism is non-sporulating and the acid-fast stain reaction (Ziehl-Neelsen) is negative.

CULTURAL AND PHYSIOLOGICAL CHARACTERISTICS

Strain C501-B8 develops into two forms on agar plate, a smooth (S) colony and a rough (R) colony. The difference is particularly obvious on sugar media. Detailed descriptions of both colonies are shown in Table 1, below.

Table 1

|  | Smooth (S)-type Colony | Rough (R)-type Colony |
| --- | --- | --- |
| YGA-agar Plate (colony) | Circular, occasionally partly effluent, raised; smooth surface, entire margin. Soft, watery and glistening; opaque to semi-translucent. Size: 4-8 mm. (dia.). Color: Creamy to pale-pink orange. | Amorphous, convex (umbonate); rough and granulated surface, irregular to crenated margin. Rigid, dull and dried; opaque. Size: 2-3.5 mm. (dia.). Color: Pale-orange to vivid-orange. |
| YGA-agar slant (growth) | Abundant growth. Smooth, soft, effluent, watery, opaque, and creamy, later pale-orange. Not viscid. No soluble pigment. | Abundant growth. Rigid, granular, dried and vivid orange. Not viscid. No soluble pigment. |
| YGA-agar | 1% glucose, 0.1% Na-aspartate, 0.05% asparagine, 0.1% K$_2$HPO$_4$, 0.1% NaCl, 0.05% MgSO$_4$ 7H$_2$O, 0.05% CaCl$_2$ 2H$_2$O, 0.05% yeast extract, 1.5% agar. pH 7.0 to 7.2. | |

Chemical studies and synthesis have established that the product corresponds to the structure of the compound as named.

In general, the fermentation is carried out in a culture medium containing compatible carbon sources which can be assimilated by the organism. Suitable carbon sources for the antibiotic production include glycerin and sucrose. Paraffin hydrocarbons containing from about 10 to 22 carbon atoms can be assimilated by the organism but are not suitable for the antibiotic production. The production media can be supplemented by a wide range of organic nitrogen sources, such as corn steep liquor, pharmamedia, linseed meal or peanut meal.

Colonies of both types appear genetically stable, since several transfers on agar plate did not convert the progeny. Differences between the two types of colonies were observed in pH-change of Simmon's citrate agar: became acidic by S-colony, and alkaline by R-colony. The following characteristics are the same for both types.

Nutrient agar slant: Abundant growth. Smooth, slightly granular, opaque and creamy, later pale-orange. Not viscid.

Nutrient broth: Surface ring growth. No pellicle and slight turbidity. Pale-orange sediment.

Growth temperature: Scant or no growth at 37° C. and 5° C. Restricted growth at 34° C. and 15° C. Moderate growth at 32° C. to 20° C. Optimum, 28° C.
Oxygen demand: Obligately aerobic.

Milk: Slightly orange ring-growth at surface. Sediment turns to light orange after 2 to 3 weeks. Slightly alkalized (pH 7.2 to 7.8) without coagulation and peptonization.

Growth factor: None.

The physiological reactions, carbohydrate utilization, and utilization of peculiar substrates as sole carbon sources by strain C501-B8 are shown in the following Tables 2, 3 and 4, respectively.

As can be seen in these tables, the various morphological, cultural and physiological characteristics of strain C501-B8 are essentially the same as those of *Arthrobacter oxamicetus*, the oxamicetin-producing organism. In view of the entirely different antibiotic produced, the present strain, C501-B8, is given a name of *Arthrobacter oxamicetus* var. *propiophenicolus*.

Table 3

Carbohydrate Utilization

| | | | |
|---|---|---|---|
| Glycerol | + | Maltose | − |
| L-Arabinose | − | D-Raffinose | − |
| D-Xylose | − | Inositol | + |
| L-Rhamnose | − | D-Mannitol | + |
| D-Fructose | + | D-Sorbitol | + |
| D-Galactose | − | Dulcitol | − |
| D-Glucose | + | Starch | − |
| D-Mannose | − | Cellulose | − |
| Sucrose | + | Inuline | − |
| Lactose | − | Salicine | − |

Medium: 0.1% $NH_4Cl$, 0.1% $K_2HPO_4$, 0.05% $MgSO_4 \cdot 7H_2O$, 0.05% NaCl, 0.1% $CaCo_3$, 0.01% yeast extract, 1.5% Bacto-agar. 0.00% BTB. pH 7.0.
Carbohydrate: 1.0%.

Table 4

Substrate Utilization, Carbon Source

| | | | |
|---|---|---|---|
| Chitin | − | Polyethylene- | |
| Ethanol | + (pH <5.8) | glycol 600 | − |
| Phenol | − | Liquid paraffin | + (pH 7.2) |
| Alginate | − | Phenylacetamide | − |
| Aniline | − | Sulfanilic acid | − |
| Dehydroxycholic | | Salicylic acid | − |
| acid | + (pH <5.8) | Diphenylamine | − |
| 2-keto-gluconate | + (pH <5.8) | Benzidine | − |
| Propionate | + (pH >8.2) | α-Naphthylamine | − |
| Tween 80 | + (pH <5.8) | o-Phthalic acid | − |

Medium: 0.1% $NH_4Cl$, 0.1% $K_2HPO_4$, 0.05% $MgSO_4 \cdot 7H_2O$, 0.05% NaCl, 0.01% $CaCO_3$, 0.01% yeast extract, 1.5% Bactoagar. 0.002% BTB. pH 7.0.
Carbon source substrate: 1.0%.

In the production of D-*threo*-1-p-nitrophenyl-2-propionamido-1,3-propanediol, an agar slant of *Arthrobacter oxamicetus* var. *propiophenicolus* (strain C501-B8) was used to inoculate a seed culture medium having the Table 2

Physiological Reactions

| Test | Response | Method and Medium Employed |
|---|---|---|
| Survival test at 72° C. | Not Survived | 10 minutes in milk |
| Decomposition of cellulose | Negative | Inorganic salts plus 0.05% yeast extract |
| Utilization of ammonium salts as a sole nitrogen source | Positive | Inorganic salts plus 1% sugar |
| Utilization of nicotine | Negative | Nicotine agar (Sguros, 1955) |
| Pigment from nicotine | Negative | Nicotine agar (Sguros, 1955) |
| Starch hydrolysis | Negative | Hayward's starch agar |
| Nitrite from nitrate | Negative | Peptone broth plus 0.1% $KNO_3$ |
| Gelatin liquefaction | Negative | Peptone broth plus 25% gelatin (Skerman, 1967) |
| Milk peptonization | Negative | Incubation at 22° C. for 3 weeks |
| Milk coagulation | Negative | |
| Change of pH in milk | Slightly alkalized | |
| Indole production | Negative | Peptone broth (Kovacs' reagent) |
| Voges-Proscauer reaction | Negative | Peptone broth plus 1% glucose |
| $H_2S$ production from cysteine & thio sulfate | Positive | Skerman's (1967) method |
| Gas from carbohydrate | Negative | Glucose, sucrose & mannitol as carbohydrate |
| Urease reaction | Positive | Christensen's urea medium |
| Catalase reaction | Positive | Hydrogen-peroxide solution |
| Oxidase reaction | Negative | Reaction of p-aminodimethyl aniline oxalate (Kovacs' oxidase reagent) | following composition: 2.0% glycerol, 1.0% pharma media, 1.0% corn steep liquor, 0.3% $(NH_4)_2SO_4$, 0.003% $ZnSO_4 \cdot 7H_2O$ and 0.4% $CaCO_3$. The seed culture was incubated at 28° C. for two days on a rotary shaker operating at 250 rpm, after which 2 ml. of the growth was transferred to 100 ml. of a fermentation medium having the following composition: 2.0% glycerol, 2.0% linseed meal, 1.0% peanut meal, 0.3% $(NH_4)_2SO_4$ and 0.5% $CaCo_3$ in a 500-ml. Erlenmeyer flask.

The fermentation medium was incubated at about 28° C. The progress of the fermentation was followed by the paper disc agar plate assay using *Bacillus subtilis* PCI-219 as the test organism. Generally, antibiotic production reached a maximum of about 500 to 1,000 mcg./ml. in 3 to 5 days.

The harvested broth (ca.8L, 500 mcg./ml.) was filtered at pH 7.0 with filter aid. The active substance in the filtrate was extracted twice with 3 L. of ethyl acetate. The extracts were combined, dried over anhydrous sodium sulfate and concentrated in vacuo to about 40 ml. The concentrate was added dropwise to 1,000 ml. of n-hexane to give about 4 g. of hygroscopic solid. The crude solid was dissolved in a small volume of ethyl acetate and adsorbed on a column containing 200 ml. of silica gel, which was eluted with ethyl acetate. The active fractions were collected, concentrated in vacuo to dryness and the residue was triturated with 50 ml. of anhydrous benzene. The solid thus obtained, ca. 2 g., was crystallized from ethyl acetate and recrystallized from the same solvent to yield 500 mg. of D-threo-1-p-nitrophenyl-2-propionamido-1,3-propanediol, hereafter referred to as Bu-2000.

Antibiotic Bu-2000 has been recovered as neutral, colorless needles melting at 112.5° C. to 113.5° C. The specific rotation is: $[\alpha]_D^{23.5} = +12.8°$ (c 1.33, MeOH).

---

Anal. Calc'd. for $C_{12}H_{16}N_2O_5$ (MW: 268)
C 53.73, H 6.01, N 10.44
Found: C 54.00, H 6.24, N 10.42. No halogen and no sulfur.

---

It gives positive reaction with Ehrlich reagent and decolorizes permanganate in alkaline solution. Ninhydrin reaction is negative. It is soluble in acetone, ethylacetate, and lower alcohols; slightly soluble in ether and water; and practically insoluble in benzene and n-hexane.

The UV spectrum showed an absorption maximum at 276 m$\mu$ ($\epsilon$: 10,500) in ethanol. The IR spectrum in KBr indicated presence of NH or OH (3,500–3,100 cm$^{-1}$), amide (1,645 and 1,560 cm$^{-1}$), phenyl (1,605 cm$^{-1}$), nitro (1,510 and 1,350 cm$^{-1}$) and hydroxy group (1,080–1,060 cm$^{-1}$). The NMR spectrum in $d_6$-dimethylsulfoxide showed a set of signals due to one propionyl group at $\delta$ 0.81 ($t, J = 7.5$ Hz, 3 H) and 1.98 ppm ($q, J = 7.5$ Hz, 2 H), four aromatic protons at $\delta$ 7.44 to 8.03 ppm (two doublets, $J = 9$ Hz, 4 H), are methylene proton at $\delta$ 3.1 to 3.6 ppm ($m$, 2 H), and one methine proton at $\beta$ 4.83 to 5.05 ppm ($m$, 1 H). In addition, there are three signals appearing at $\delta$ 4.69 ppm ($t, J = 5.3$ Hz, $-CH_2-OH$), $\delta$ 5.64 ppm

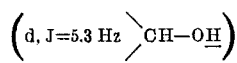

and $\delta$ 7.22 ppm ($d, J = 10$ Hz, $-NH-CO-$), which disappear upon addition of $D_2O$ to the solution.

The above-described analytical and spectral data along with a chloramphenicol like antibacterial spectrum were indicative that Bu-2000 was a propionyl derivative of desdichloroacetyl-chloramphenicol. In order to establish the identity, D-threo-2-amino-1-p-nitrophenyl-1,3-propanediol, which was prepared from chlramphenicol, was reacted with propionic anhydride to yield D-threo-1-p-nitrophenyl-2-propionamido-1,3-propanediol. Antibiotic Bu-2000 was identical with the synthetic compound in every respect.

The minimum inhibitory concentrations (MIC) of Bu-2000 against various bacteria were determined by the serial agar dilution method on Nutrient agar plates. The results are shown in Table 5, below, in comparison with chloramphenicol.

Bu-2000 exhibits similar antibacterial spectrum to that of chloramphenicol and complete cross resistance is seen between the two. The intrinsic activity of Bu-2000 is in general about one-eighth of that of chloramphenicol.

Table 5

Antibacterial Spectra of Bu-2000

| Test Organism | | Bu-2000 | Chloramphenicol |
|---|---|---|---|
| Staphylococcus aureus | 209P | 12.5 | 1.6 |
| do. | Smith | 25 | 3.1 |
| do. | No.193 | 25 | 3.1 |
| do. | A20239 | 25 | 3.1 |
| do. | BX-1633 | 50 | 6.3 |
| do. | Terajima | 12.5 | 1.6 |
| do. | Russell | 25 | 6.3 |
| Sarcina lutea PCI 1001 | | 12.5 | 1.6 |
| Micrococcus flavus | | 6.3 | 0.8 |
| Bacillus mycoides | | 12.5 | 1.6 |
| do. sphaericus | | 25 | 3.1 |
| do. cereus ATCC 10702 | | 6.3 | 1.6 |
| do. subtilis PCI 219 | | 6.3 | 0.8 |
| do. anthracis No. 115 | | 3.1 | 0.4 |
| Escherichia coli | NIHJ | 6.3 | 0.8 |
| do. | PO 1495 | >100 | >100 |
| do. | Juhl | 25 | 3.1 |
| do. | A151569 | 12.5 | 0.8 |
| do. | A20363 | >100 | >100 |
| do. | A9844 | 25 | 6.3 |
| do. | K-12 | 25 | 3.1 |
| do. | A20665 | 12.5 | 1.6 |
| Klebsiella pneumonia | D-11 | 6.3 | 0.8 |
| do. | A9678 | >100 | >100 |
| do. | A9977 | 12.5 | 1.6 |
| Pseudomonas aeruginosa | D15 | >100 | 100 |
| do. | D113 | >100 | >100 |
| Proteus vulgaris A9436 | | 12.5 | 0.8 |
| do. do. A9526 | | 6.3 | 0.8 |
| do. morganii A9553 | | 25 | 6.3 |
| do. do. A20031 | | 100 | 12.5 |
| do. rettgeri A9637 | | 6.3 | 0.8 |
| do. mirabilis A9554 | | 100 | 12.5 |
| do. do. A9900 | | 100 | 12.5 |
| Shigella dysenteriae | | 3.1 | 0.8 |
| do. flexneri A9684 | | 6.3 | 1.6 |
| do. sonnei Yale | | 3.1 | 0.8 |
| Salmonella enteritidis A9531 | | 6.3 | 1.6 |
| do. typhosa Yale | | 12.5 | 3.1 |
| do. paratyphi A | | 6.3 | 0.8 |

In vivo activity

The therapeutic activity of Bu-2000 was compared with chloramphenicol against several experimental infections in mice. Mice were inoculated intraperitoneally with a 100 × $LD_{50}$ dose of the pathogen, and the antibiotics were administered subcutaneously or orally just after the bacterial challenge.

The results are shown in Table 6, below. Bu-2000 was found to possess relatively higher in vivo activity than one can expect from its weak in vitro activity. Bu-2000 is supposed to be well absorbed orally in view of the fact that nearly the same $CD_{50}$ value was obtained by the subcutaneous and oral administrations. Chloramphenicol was about two to three times more active than Bu-2000 in these in vivo tests.

Urinary recovery in rats

Groups of five rats weighing 200 to 250 g. were administered either subcutaneously or orally with 200 mg./kg. of Bu-2000 and chloramphenicol. They were placed in metabolism cage, and the urine samples were collected following 24 hours post-administration. Antibiotic levels in urine samples were determined by the paper disc agar diffusion assay on *E. coli* NIHJ plate, and the percent recovery was calculated from the antibiotic level, the urine volume and the total dose administered.

The results are shown in Table 7, below. Much higher urine levels were attained in the rats receiving Bu-2000 than those of chloramphenicol group, and the urinary recovery of Bu-2000 was about seven to 10 times greater than that of chloramphenicol.

Toxicity

The acute toxicity of Bu-2000 was determined in mice comparatively with chloramphenicol, the intravenous $LD_{50}$ being 2,000 mg./kg. for Bu-2000 and 280 mg./kg. for chloramphenicol.

Table 6

Therapeutic Activity of Bu-2000 and Chloramphenicol

| Test Organism | $CD_{50}$ (mg/kg) | | | |
|---|---|---|---|---|
| | Bu-2000 | | Chloramphenicol | |
| | sc | po | sc | po |
| S. aureus Smith | 82 | 100 | 27 | 40 |
| E. coli NIHJ | 18 | 22 | 8.5 | .12 |
| K. pneumoniae D11 | 12.5 | 16 | 7.4 | 9 |
| P. vulgaris A9436 | 50 | 50 | 12.5 | 12.5 |
| P. mirabilis A9554 | 72 | 69 | 19 | 21 |

Table 7

Urinary Recovery of Bu-2000

| Dose | Route | Bu-2000 | | Chloramphenicol | |
|---|---|---|---|---|---|
| | | Urine Level* | % Recovery | Urine Level | % Recovery |
| 200 mg/kg | sc | 1425 mcg/ml | 23.5% | 173 mcg/ml | 3.6% |
| 200 mg/kg | po | 1300 mcg/ml | 25.0% | 137 mcg/ml | 2.4% |

* Mean urine level for the pooled urine sample (0 to 24 hours).

What is claimed is:

1. A process for producing D-*threo*-1-p-nitrophenyl-2-propionamido-1,3-propanediol, which comprises cultivating *Arthrobacter oxamicetus* var. *propiophenicolous*, ATCC 21814, under aerobic conditions in a synthetic aqueous media containing a source of carbon and nitrogenous nutrient until substantial antibiotic activity is produced in said media.

2. The process of claim 1, wherein said media contains a carbohydrate as a source of carbon.

3. The process of claim 1, wherein the cultivation is carried out at a temperature from about 20° C. to 32° C.

* * * * *